United States Patent [19]
Lühmann et al.

[11] Patent Number: 5,913,480
[45] Date of Patent: Jun. 22, 1999

[54] REDETACHABLE, SELF-ADHESIVE FASTENING DEVICE

[75] Inventors: Bernd Lühmann, Norderstedt; Ralf Dicks, Jork; Alexander Schwade, Hamburg, all of Germany

[73] Assignee: Beiersdorf AG, Hamburg, Germany

[21] Appl. No.: 08/724,712

[22] Filed: Sep. 30, 1996

[30] Foreign Application Priority Data

Oct. 6, 1995 [DE] Germany ............................ 195 37 323

[51] Int. Cl.⁶ .................................................. F16B 47/00
[52] U.S. Cl. ............................. 24/304; 428/166; 428/354
[58] Field of Search ............................... 24/304, DIG. 11; 248/205.3, 339, 467; 428/166, 167, 354

[56] References Cited

U.S. PATENT DOCUMENTS

| | | | |
|---|---|---|---|
| 2,510,120 | 6/1950 | Leander | 24/DIG. 11 |
| 3,160,970 | 12/1964 | Worrell . | |
| 3,454,249 | 7/1969 | Geisinger . | |
| 4,103,860 | 8/1978 | Haas et al. . | |
| 4,181,553 | 1/1980 | Hogg . | |
| 4,299,223 | 11/1981 | Cronkite . | |
| 4,489,119 | 12/1984 | Ishige et al. . | |
| 4,756,498 | 7/1988 | Frye . | |
| 4,921,747 | 5/1990 | Studley . | |
| 5,227,233 | 7/1993 | Itaba et al. . | |
| 5,409,189 | 4/1995 | Lühmann . | |
| 5,433,413 | 7/1995 | Adams . | |

FOREIGN PATENT DOCUMENTS

| | | |
|---|---|---|
| 3205540 | 9/1983 | Germany . |
| 4233872 | 3/1994 | Germany . |
| 4233872 | 7/1994 | Germany . |
| 9106782 | 5/1991 | WIPO . |
| WO92/11333 | 7/1992 | WIPO . |
| WO94/21157 | 9/1994 | WIPO . |

*Primary Examiner*—James R. Brittain
*Attorney, Agent, or Firm*—Sprung Kramer Schaefer & Briscoe

[57] ABSTRACT

Redetachable, self-adhesive fastening device having a base plate, the front side of which serves for fastening and the rear side of which has a strip of an adhesive film which is adhesive on both sides and is adhesively attached in such a way that one end of the adhesive film protrudes beyond the base plate as a grip, the adhesive film being of such a kind that the adhesive bond achieved with it can be released again by pulling in the direction of the adhesive bonding plane, stretching the strip, characterized in that the rear side of the base plate has duct-like depressions in the region in which the strip of adhesive film is adhesively attached, these depressions extending at least partially beyond the region of the strip of adhesive film.

7 Claims, 2 Drawing Sheets

REDETACHABLE, SELF-ADHESIVE FASTENING DEVICE

The invention relates to a redetachable, self-adhesive fastening device which can be released again from its adhesive bond without leaving any residue by pulling on the adhesive film, arranged on it, in the direction of the bonding plane. In particular, the invention relates to a hook of this type.

Such devices, in particular hooks, are known. For instance, DE 42 33 872 C2 describes a redetachable, self-adhesive hook which is equipped with an adhesive film which can be adhesively released by pulling and which is commercially available as "tesa® Power Strips with Hooks".

WO 94/21157 discloses such a hook, which differs from the abovementioned hook in particular by the use of an adhesive film of the kind which is highly extensible and at the same time does not recover its original form.

In the practical use of such hooks, problems may occur, however, in that the desired adhesive bonding strengths are not always achieved. While it may initially be assumed that this is due to the respective underlying surfaces on to which these hooks are adhesively attached, on closer investigation it has been found that this could not have been the cause of some inadequate adhesive bonding strengths. This disadvantage in all the more relevant to practical applications when occasionally these hooks are also very much intended to secure relatively heavy loads.

The object of the invention was to remedy this situation, in particular to provide a fastening device which ensures high adhesive bonding strengths which can be reproduced well and nevertheless permits unproblem-atical "stripping" of the adhesive films used in order to separate the bond without leaving any residue.

This object is achieved by the fastening devices characterized more specifically in the claims.

It has been found in this respect that it is pockets of air entrapped when adhesively bonding the strip of adhesive film on to the smooth rear side of the hook that evidently contribute to the problems mentioned at the beginning. This is so since remarkably better values for adhesive bonds are achieved with hooks or fastening devices provided according to the invention with air ducts. It seems that in this way the actual adhesive bonding surface can be increased considerably, in particular in the case of low contact pressure.

BRIEF DESCRIPTION OF THE DRAWINGS

The fastening devices according to the invention, in particular hooks, may be formed from different materials, but preferably produced from injection-moulded plastic. Duct-like depressions in the rear side, which serve for displacing the air during adhesive attachment, may run vertically, horizontally or else nonuniformly. A preferred arrangement is that of ducts crossing at right angles. As shown in FIG. 1, it is functionally essential that the ducts extend over the adhesive bonding surface, in order to permit the transport of entrapped air. In practice, it is found that ducts should be about 0.3–2.5 mm, in particular about 0.5–1.0 mm, in width and depth in order to permit effective transport. Higher gap widths are possible in principle, but in this case the adhesive bonding surface is significantly reduced. The spacings between neighbouring ducts should not be greater than about 10–20 mm, in particular not greater than about 15 mm.

Figure 1:
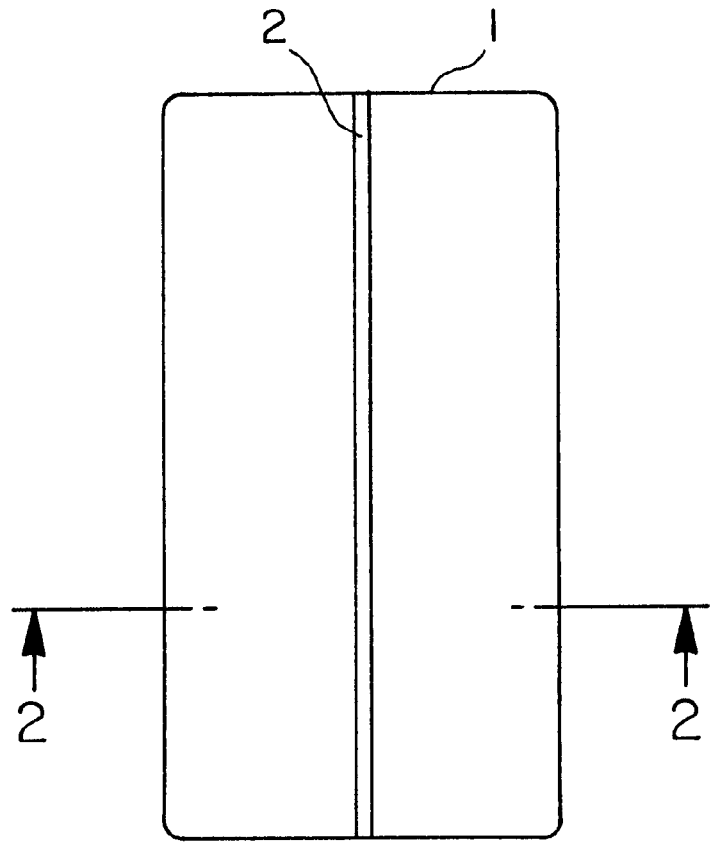
FIG. 1 is a view of the rear surface of base plate (1) having a duct-like depression (2) according to the invention.

Injection-moulded hooks may be produced from the customary plastics, such as polystyrene, polyamide, polyethyleneterephthalate, polypropylene, etc., to mention just a few.

Air ducts may be made in the rear side in a separate work step or be already integrated into the injection mould. The latter method is suitable particularly from economic aspects.

Adhesive films according to the invention are, in particular, those corresponding to DE 33 31 016, DE 42 22 849, DE 42 33 872, WO 92/11333 and WO 94/21157.

For instance, DE 33 31 016 A1 describes an adhesive film for re-releasable adhesive bonds which allows an adhesive bond established therewith to be releasable by pulling on the adhesive film in the direction of the adhesive bonding plane. With such adhesive films, high adhesive forces and shear strengths can be achieved and adhesive bonds can be released again without further aids, in a way comparable to the opening of a preserving jar, similar to the way in which there the rubber seal is pulled by the grip out of the seal joint.

DE 42 22 849 C1 describes such an adhesive film with a UV-permeable grip.

WO 92/11333 also describes, inter alia, adhesive films for corresponding applications, the adhesive film used having a low elasticity with at the same time high extension.

Double-sided self-adhesive tapes with a foam intermediate substrate, for example of polyethylene foam can also be used according to the invention. If, in particular, the adhesive films with a foam-intermediate substrate which are used are of a small thickness and/or if a foam of great hardness (low compressibility) is used, hook bodies with air ducts can likewise be used successfully for increasing the adhesive bonding surface.

In general, for production, processing and handling of the particularly preferred adhesive films, reference is made to DE 33 31 016, DR 42 22 849 and WO 92/11333.

In the following examples, the invention is to be described with reference to exemplary embodiments, without wishing to restrict it unnecessarily thereby. All parts are understood to mean parts by weight.

EXAMPLE 1a

Comparative Example

The transparent base plate of a plastic hook is adhesively attached to a planar PMMA plate. The base plate, consisting of transparent polystyrene, has the dimensions 42.5 mm * 22.5 mm * 4 mm (height * width * depth). The rear side of the plate is of good planarity: visually, reflected images on the rear side of the plate show no noticeable deformations. The adhesive bonding is performed by means of a double-sided pressure-sensitive adhesive film with an adhesive bonding surface of 50 mm * 20 mm, which bears on one narrow end a grip of the dimensions 14 mm * 20 mm, obtained by laminating 12 mm thick PETP film on both sides. Corresponding adhesive films are commercially available under the trade name tesa Power-Strip, according to the example from DE 33 31 016 C2. After removing a release paper, the adhesive film is adhesively attached manually on to a transparent PMMA plate, 5 mm thick, visually achieving a 100% adhesive bonding surface. After removal of the second release paper from the adhesive film, the base plate of the hook is adhesively attached by hand with a contact pressure of about 250 N. The test is repeated several times. Owing to the entrapment of air bubbles, only adhesive bonding surfaces of 50% to 70% of the total surface area of the adhesive film are achieved between the base plate of the hook and the adhesive film.

EXAMPLE 1b

According to the Invention

Figure 2:
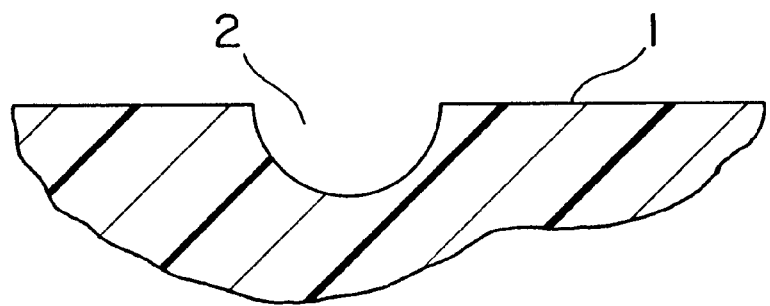
FIG. 2 is a sectional view of section 2—2 of FIG. 1, showing the duct-like depression
Figure 3:
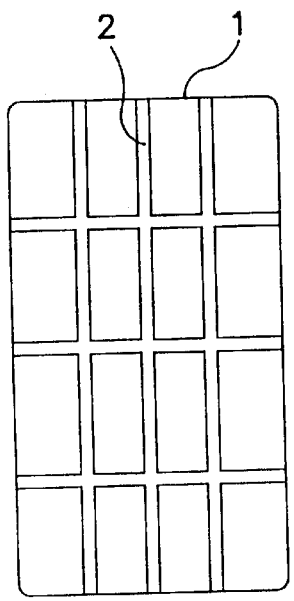
FIG. 3 is a view of the rear surface of base place (1) having a plurality of horizontal and vertical duct-like depressions (2).
Figure 4:
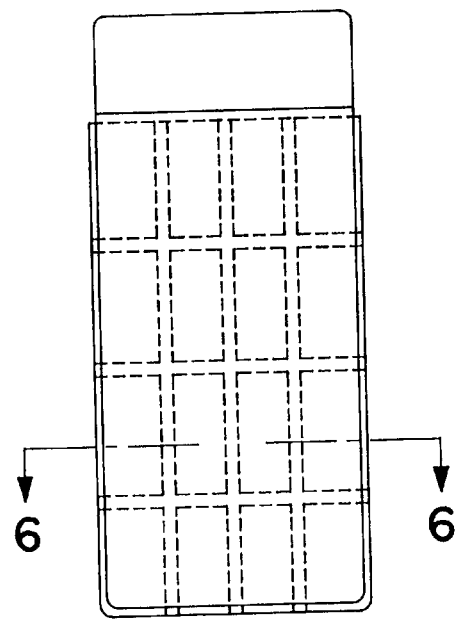
FIG. 4 is a view of the rear surface of base plate (1) as shown in FIG. 3, but with an adhesive strip laid over it. The adhesive strip has a grip area which extends beyond the surface of the base plate. The duct-like depressions can be seen as extending beyond the adhesive covering.
Figure 5:
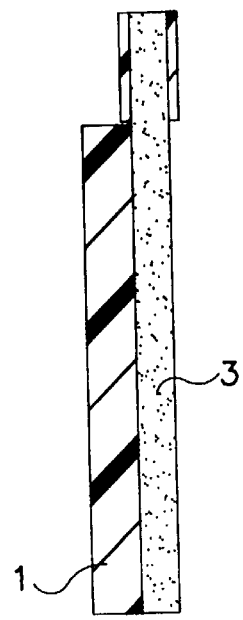
FIG. 5 is a side view of the adhesive-covered base plate shown in FIG. 4, depicting the base plate (1) and adhesive strip (3).
Figure 6:
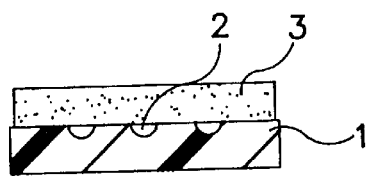
FIG. 6 is a sectional view of section 6—6 of FIG. 4, showing the duct-like depressions (2) in base plate (1), and also showing adhesive covering (3).

As a difference in comparison with Example 1a, use is made of a hook base plate which bears at spacings of respectively 7.5 mm from the left plate border and right plate border over the entire length of the plate a U-shaped notch such as that shown in FIG. 2, in each case 1 mm wide and 1 mm deep. The adhesive bonding takes place in a way corresponding to Example 1a. In contrast to Example 1a, in all cases adhesive bonding surfaces of >95% of the total surface area of the adhesive film are achieved.

EXAMPLE 1c

Comparison

A double-sided adhesive film corresponding to Example 1a (grip film of dimensions 10 mm * 20 mm) is attached on to a PMMA plate of the dimensions 35 mm * 120 mm * 3 mm (width * length * thickness), centrally at one end, in such a way that the grip protrudes on one side beyond the border (one of the short sides) of the PMMA plate. A second PMMA plate of identical dimensions is adhesively bonded to the first plate, offset in parallel in such a way that the plate protrudes 10 mm beyond the end of the adhesive film. For adhesive bonding, the second PMMA plate is applied vertically on to the adhesive film, then pressed on to it for 5 seconds at 100 N . The adhesive bonding surface obtained is about 50%. The test piece thus obtained is subjected to a dynamic tensile shearing test along the lines of DIN 53283. The separation rate is 10 nm/min. The test is carried out until the adhesive bond ruptures. 290 newtons is determined as the rupture load.

EXAMPLE 1d

According to the Invention

As an alternative to Example 1c, a PMMA plate having a central V-shaped notch of 1 mm in width and 0.5 mm in depth is used as the second plate. The adhesive bonding surface obtained is around >90%. 350 newtons are achieved as the rupture load.

EXAMPLE 1e

Comparison

An adhesive film corresponding to Example 1a is adhesively attached on to a square wall hook plate consisting of steel and of the dimensions 40 mm * 40 mm * 3.5 mm in such a way that the grip protrudes beyond one of the longitudinal sides of the steel plate. After detaching the rear release paper of the adhesive film, the laminate comprising wall hook plate and adhesive film is adhesively attached on to a planar PMMA plate in a way corresponding to Example 1c. The contact pressure for the adhesive bond is 100 N, the pressing time 5 seconds. The adhesive bond is subsequently subjected to a tilting/shearing loading. For this purpose, a steel pin is screwed into the steel wall hook plate on the rear side—centrally and perpendicularly with respect to the steel plate surface. With a lever arm of 50 mm and a tilting/shearing load of 20 N, a holding time of 2040±380 min is determined.

EXAMPLE 1f

According to the Invention

The adhesive bonding corresponding to Example 1e is carried out on a notched PMMA plate corresponding to Example 1d; the holding time increases to 3520±340 min.

We claim:

1. Redetachable, self-adhesive fastening device having a base plate, the front side of which serves for fastening and the rear side of which has a strip of an adhesive film which is adhesive on both sides and is adhesivevely attached in such a way that one end of the adhesive film protrudes beyond the base plate as a grip, the adhesive film being of such a kind that the adhesive bond achieved with it can be released again by pulling in the direction of the adhesive bonding plane, stretching the strip, characterized in that the rear side of the base plate has duct-like depressions in the region in which the strip of adhesive film is adhesively attached to displace air during adhesive attachment, these depressions extending at least partially beyond the region of the strip of adhesive film.

2. Device according to claim 1, characterized in that the depressions run vertically and/or horizontally or else non-uniformly over the rear side of the base plate.

3. Device according to claim 1, characterized in that the depressions cross one another approximately at right angles.

4. Device according to claim 1, characterized in that the depressions measure about 0.3–2.5 mm, in particular 0.5–1.0 mm, in width and in depth.

5. Device according to claim 1, characterized in that the depressions have a spacing from one another of at most about 10–20 mm, in particular at most 15 mm.

6. Device according to claim 1, characterized in that the adhesive film, with or without an intermediate substrate, is elastically or plastically extensible.

7. Device according to claim 1, characterized in that the adhesion of the adhesive film is less than the cohesion, the adhesiveness is to a great extent dissipated when the film is extended, and the ratio of pulling-off force to tearing load is at least 1:1.5, the adhesive film being of the kind which is based on thermoplastic rubber and tackifying resins, with high elasticity and low plasticity.

* * * * *